(12) United States Patent
Wixey

(10) Patent No.: US 6,289,778 B1
(45) Date of Patent: Sep. 18, 2001

(54) ADJUSTABLE TOOL STATION

(75) Inventor: Barry D. Wixey, Westminster, MD (US)

(73) Assignee: Delta International Machinery Corp., Pittsburgh, PA (US)

( * ) Notice: Subject to any disclaimer, the term of this patent is extended or adjusted under 35 U.S.C. 154(b) by 0 days.

(21) Appl. No.: 09/323,763

(22) Filed: Jun. 1, 1999

Related U.S. Application Data

(63) Continuation of application No. 08/846,047, filed on Apr. 25, 1997, now Pat. No. 5,988,031, which is a continuation of application No. 08/255,421, filed on Jun. 8, 1994, now abandoned.

(51) Int. Cl.$^7$ .............................. B27B 5/20; B23D 45/14
(52) U.S. Cl. .................... 83/471.3; 83/473; 83/486.1; 83/490; 83/581; 83/859
(58) Field of Search ................... 83/471.3, 581, 83/468.3, 468.4, 468.7, 471.2, 486, 486.1, 488, 489, 472, 473, 490, 574, 745, 859; 269/57, 63, 290, 291, 303, 304, 305, 315; 144/286.1, 286.5, 253.1

(56) References Cited

U.S. PATENT DOCUMENTS

| | | | |
|---|---|---|---|
| 206,360 | * 7/1878 | Shimer et al. | 144/253.1 X |
| 1,646,589 | 10/1927 | Meek et al. | 83/471.3 |
| 2,799,305 | * 7/1957 | Groehn | 144/253.1 |
| 2,902,066 | 9/1959 | Borden | 83/471 |
| 4,245,533 | 1/1981 | Batson | 83/471.3 |
| 4,537,105 | 8/1985 | Bergler | 83/471.3 |
| 4,587,875 | 5/1986 | Deley | 83/471.3 |
| 4,741,370 | * 5/1988 | Heaton | 144/253.1 X |
| 5,054,352 | 10/1991 | Fushiya et al. | 83/468.3 |
| 5,060,548 | 10/1991 | Sato et al. | 83/471.3 |
| 5,241,888 | 9/1993 | Chen | 83/471.3 |
| 5,392,678 | 2/1995 | Sasaki et al. | 83/471.3 |

FOREIGN PATENT DOCUMENTS

| | | |
|---|---|---|
| 2140158 | 12/1995 | (CA). |
| 0133666 | 6/1988 | (EP). |
| 47-32229 | 9/1972 | (JP). |
| 63-38978 | 10/1988 | (JP). |

OTHER PUBLICATIONS

Delta Specialty Saws Product Brochure, Jan. 1993.
Article entitle "Makita Fills the Compound Miter Gap", Apr. 1991.
Advertisements for Makita and Ryobi Saws, Date unknown.
"Sliding Compound Miter Saws; Surveying Six Clever Crosscutting Tools", *Fine Woodworking*, May/Jun. 1993, No. 100, pp. 44–48, depicting the AEG SKS300, Delta Sidekick 33–060, Makita LS1011, Hitachi C8FB, Ryobi TSS–220, Sears 23488 and DeWalt DW 705 miter saws.
"Sliding Compound Miter Saws", *The Woodworker's Journal*, Jan./Feb. 1993, vol. 17, No. 1, pp. 69–71, depicting the Hitachi C8FB, Makita LS1011, Ryobi TSS–220, Sears 23488 and Delta 33–060 miter saws.

(List continued on next page.)

Primary Examiner—Clark F. Dexter
(74) Attorney, Agent, or Firm—Kirkpatrick & Lockhart LLP

(57) ABSTRACT

An adjustable tool station which includes a subframe, a table portion rotatably attached to the subframe, wherein the table portion includes an upper surface defining a work support plane, a tool mounted to the table portion, and a fence fixed to the subframe and extending above the work support plane, wherein the fence includes a first side and a second, opposite side. The first side constitutes a workpiece guide surface, and defines a workpiece guide area which includes all points which are closer to the first side than the second side. All portions of the subframe located within the workpiece guide area are located below the work support plane.

16 Claims, 5 Drawing Sheets

OTHER PUBLICATIONS

"A Buyer's Guide to Sliding Compound Miter Saws", *American Woodworker*, Mar./Apr. 1993, depicting the Hitachi Model No. C8FB, Makita LS1011, Ryobi TSS–220, AEG SK300 and Sears 23488 sliding compound miter saws.

Advertisement entitled "Hitachi . . . The Miter Box People" for Hitachi Model Nos. C12FA, C15FB, C8FB and C10FA Miter Boxes in Feb. 1991 Woodworker's Supply Sales Catalog.

* cited by examiner

ADJUSTABLE TOOL STATION

This application is a continuation application of U.S. patent application Ser. No. 08/846,047, filed Apr. 25, 1997, now U.S. Pat. No. 5,988,031, which is a continuation of U.S. patent application Ser. No. 08/255,421, filed Jun. 8, 1994, now abandoned.

BACKGROUND OF THE INVENTION

1. Field of the Invention

The present invention relates to devices useful for supporting a workpiece relative to an adjustable tool. More particularly, the present invention relates to miter saws, compound saws, and the like.

2. Description of the Invention's Background

Many types of adjustable tool stations are known which enable a user to place a workpiece in a station and adjust the position of a tool relative to the workpiece. More specifically, many types of adjustable tool stations are known which include a tool which is adjustable relative to a fence or other part which is fixed to a base, such that a workpiece may be positioned against the fence and the tool adjusted relative thereto. An example of such a station is the Makita LS 1011 sliding compound miter saw, which is much like other stations such as the Hitachi C 8F8, the Ryobi TSS-220, the AEG SKS 300, and the Sears 23488 sliding compound miter saws.

The Makita saw includes a power saw which is rotatably mounted to a bar which slides relative to a table. The table is rotatably mounted to a base. Two portions of the base extend upwardly along either side of the table such that the base and the table form a continuous surface for a workpiece to be worked upon. The two portions also serve as attachment points for a fence which is fixed to the base and which thus remains stationary when the table rotates. In use, a workpiece is placed on the continuous surface against the fence, and the table and thus the power saw is rotatable to a desired angle relative to the workpiece.

Such an arrangement has the disadvantage, however, of requiring that the station be constructed such that the upper surfaces of the table and the two portions of the base lie in the same plane when assembled. Such a requirement requires machining within tight tolerances and very careful manufacture and assembly of the various parts of the station. These factors can greatly increase the cost to manufacture a station. Such a construction is fairly traditional, however, and generally arises from the clash between the desire to maintain a compact station and the need to fix the fence to a stationary base.

In U.S. Pat. No. 4,245,533 to Batson, a station is disclosed which presents only a single workpiece support surface. Specifically, a motor operated circular miter chop saw 10 includes a cast base structure 12 having a work supporting surface 24, and a circular saw structure 14 which is pivotable upwardly and downwardly relative to the base structure 12, but which is otherwise fixed thereto. A fence structure 18 is provided perpendicular to the surface 24, and is rotatably carried by the base structure 12 such that it is movable to various angles relative to the plane of a saw blade 20 of the saw structure 14. A pair of locking means 40 are provided to lock the fence structure 18 in a desired angular orientation.

The Batson device is disadvantageous, however, in that it provides a movable rather than a fixed fence. When a user saws a particular workpiece, as when a user works on a workpiece in most types of operations, he or she presses the workpiece against the fence with a lot of force, to maintain the workpiece in the desired angular orientation relative to the saw. The constant pressure against the fence tends to urge the fence out of its desired angular orientation, especially if several cuts are made, and thus can lead to cuts which are at an unintended angle. Even with the provision of locking means it is difficult to prevent fence movement during repeated use in a work environment.

In view of the above, it is an object of the present invention to provide an improved adjustable tool station.

It is another object of the present invention to provide an adjustable tool table which presents a single workpiece support surface.

A further object of the present invention is to provide an adjustable tool table which is relatively easy and inexpensive to manufacture and assemble.

Another object of the present invention is to provide an adjustable tool station which is relatively easy to disassemble and reassemble correctly when replacement of worn parts is needed.

Yet another object of the present invention is to provide an adjustable tool station which is relatively resistant to unintended movement of a workpiece guide surface thereof.

SUMMARY OF THE INVENTION

The above objects as well as other objects not specifically enumerated are accomplished by an adjustable tool table in accordance with the present invention. An adjustable tool station of the present invention includes a subframe, a table portion rotatably attached to the subframe, wherein the table portion includes an upper surface defining a work support plane, a tool mounted to the table portion, and a fence fixed to the subframe and extending above the work support plane, wherein the fence includes a first side and a second, opposite side. The first side constitutes a workpiece guide surface, and defines a workpiece guide area which includes all points which are closer to the first side than the second side. All portions of the subframe located within the workpiece guide area are located below the work support plane.

The objects of the present invention are also accomplished by a sliding compound miter saw which includes a subframe, a table portion rotatably attached to the subframe, wherein the table portion includes an upper surface defining a work support plane, a power saw slidably mounted to the table portion, and a fence fixed to the subframe and extending above the work support plane, wherein the fence includes a first side and a second, opposite side. The first side constitutes a workpiece guide surface, and defines a workpiece guide area which includes all points which are closer to the first side than the second side. All portions of the subframe located within the workpiece guide area are located below the work support plane.

The objects of the present invention are further accomplished by a sliding compound miter saw which includes a subframe, wherein the subframe includes a wear ring made of a relatively hard material and a base portion made of a relatively soft material and wherein the wear ring is fixed to an upper side of the base portion, a table portion, wherein the table portion includes an upper surface defining a work support plane, and a pin, wherein the pin extends into holes in the table portion and the base portion and through a hole in the wear ring to rotatably attach the table portion to the subframe and to radially locate the table portion, the wear ring, and the base portion relative to one another. The table portion is rotatable over about 102 degrees of arc relative to the subframe. The sliding compound miter saw also includes a pair of tubes slidably attached to the table portion below the work support plane, a power saw pivotally mounted to the tubes, a plurality of arcuate slots extending through the table portion, a plurality of posts extending through the arcuate slots, and a fence fixed to the posts and extending above the work support plane, wherein the fence includes a first side and a second, opposite side. The first side constitutes a workpiece guide surface, and defines a workpiece guide area which includes all points which are closer to the first side than the second side. All portions of the subframe located within the workpiece guide area are located below the work support plane. The sliding compound miter saw further includes at least three wear pads attached to an underside of the table portion, wherein the wear pads each include a contact point thereon which together define a plane generally parallel to the work support plane, the wear ring includes at least three arcuate wear zones on an upper surface thereof each extending over about 102 degrees of arc, and the wear pads contact the wear zones at the contact points to locate the work support plane in a position generally perpendicular to the workpiece guide surface.

BRIEF DESCRIPTION OF THE DRAWINGS

The preferred embodiment of the present invention will be described in greater detail with reference to the accompanying drawings, wherein like members bear like reference numerals and wherein.

DETAILED DESCRIPTION OF THE PREFERRED EMBODIMENT

Figure 1:
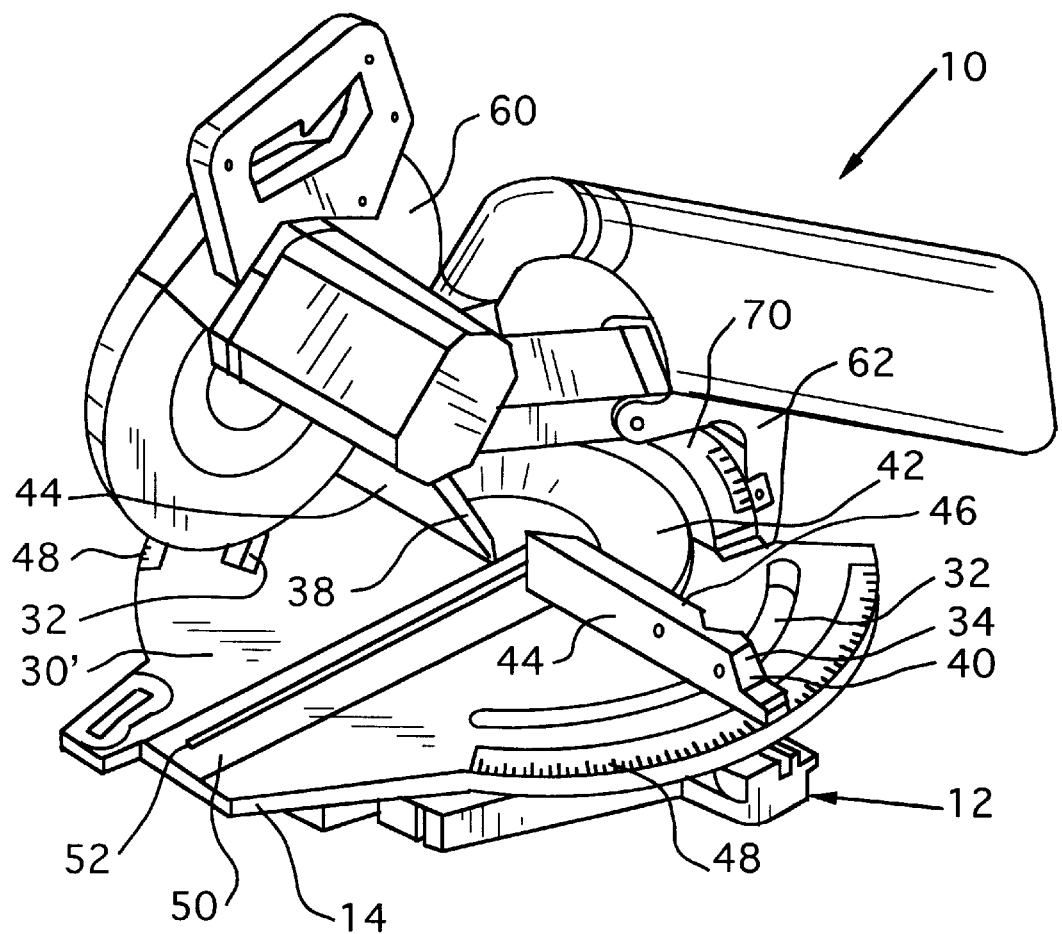
FIG. 1 is a perspective view of a sliding compound miter saw of the present invention.
Figure 2:
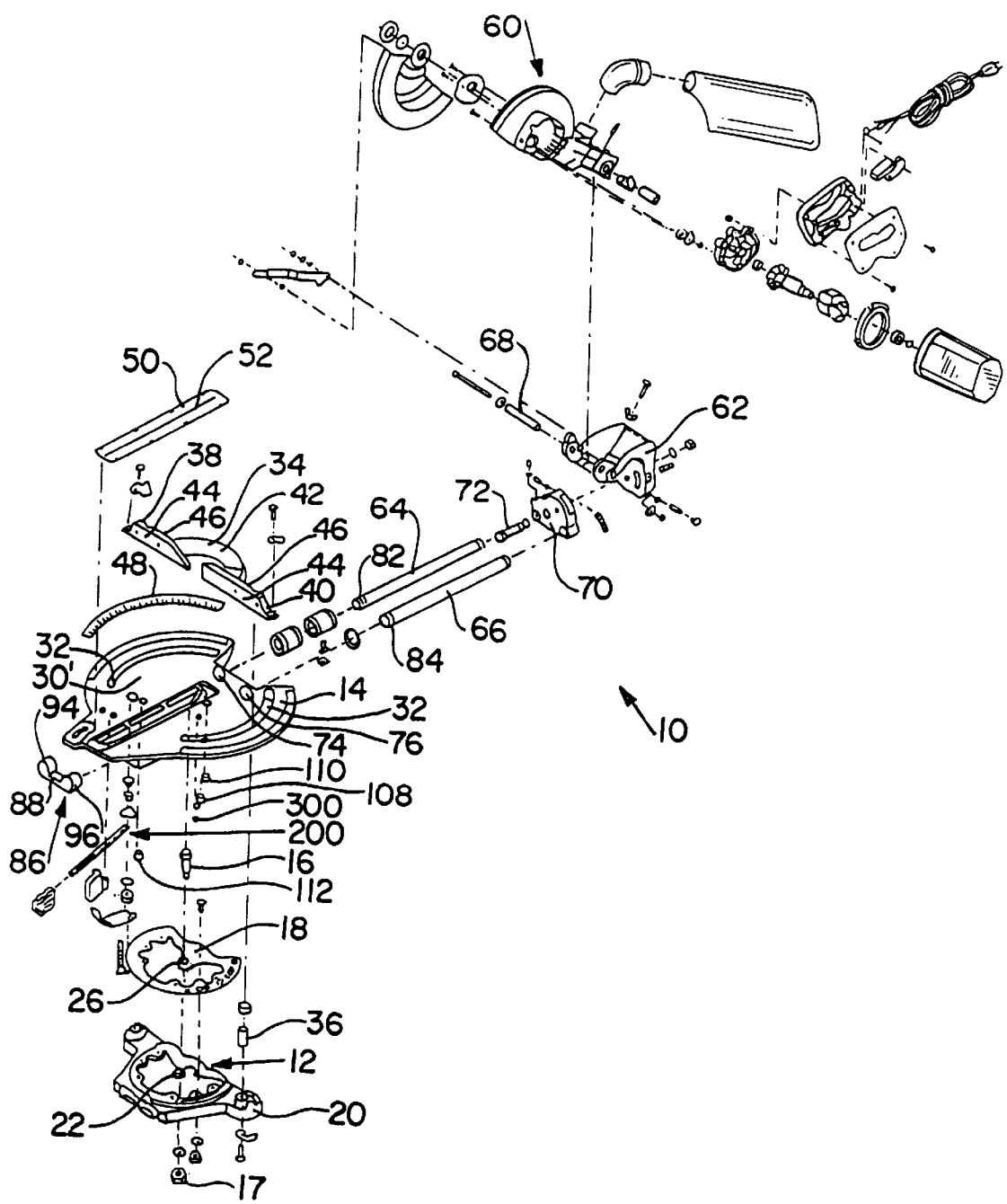
FIG. 2 is an exploded view of FIG. 1.

With reference to FIGS. 1–5, a sliding compound miter saw 10 in accordance with an embodiment of the present invention includes a subframe 12 and a table portion 14 rotatably attached to the subframe 12 by a pin 16. As shown in FIG. 2, the subframe 12 includes a wear ring 18 made of a relatively hard material, and a base portion 20 made of a relatively soft material, as will be explained more fully hereinbelow. The term "subframe" as it is used herein is not intended to include a stand or support on which the base portion 20 may be mounted, such as the stand having side supports thereon disclosed in a U.S. patent application, ser. No. 255,419, filed on Jun. 6, 1994 and entitled "Flat Folding Stand or Support". The pin 16 extends through a hole 22 in the base portion 20 and a hole 26 in the wear ring 18, and threads into a hole 24 in the table portion 14 (shown in FIG. 3). In this manner the pin 16 radially locates the table portion 14, the wear ring 18, and the base portion 20 relative to one another. A nut 17 is threaded onto the lower end of the pin 16 to prevent it from pulling out of the hole 22 accidentally.

The upper surface 30' of the table portion 14 defines a work support plane 30, and the table portion 14 includes a pair of arcuate slots 32 therethrough. Each of the slots 32 extends over about 102 degrees of arc. A fence 34, positioned above the work support plane 30, is fixed to the subframe 12 by a pair of posts 36 (only one of which is shown in FIG. 2) which extend through the slots 32. The fence 34 includes two fence portions 38, 40 connected by an arcuate portion 42. Together the two fence portions 38, 40 define a first side 44 and a second side 46 of fence 34. The first side 44 constitutes a workpiece guide surface, as will be discussed more fully hereinbelow. Further, the first side 44 defines a workpiece guide area, which includes all points which are closer to the first side 44 than the second side 46, including all of the surface area in the work support plane 30 which is in front of the fence 34 as viewed in FIG. 1. As can be seen from FIG. 1, all portions of the subframe 12 located within the workpiece guide area are located below the work support plane 30. With such a configuration, any workpiece is supported solely by the upper surface 30' and not by any portion of the subframe 12.

The table portion 14 on the upper surface 30' thereof includes a pair of arcuate scales 48 and a plate 50 having a blade cutout 52 therein, all of which are mounted on the table portion 14 to form part of the work support plane 30. A tool in the form of a powered circular saw 60 is mounted to the table portion 14 by means of a mounting bracket 62, a mounting block 70, and a pair of tubes 64, 66. The saw 60 is pivotally attached to the mounting bracket 62 by means of a pin 68, as shown in FIG. 2, such that the saw 60 is pivotable relative to the mounting bracket 62 in a first vertical plane. The mounting bracket 62 is pivotally attached to a mounting block 70 by means of a pin 72, such that the mounting bracket 62 and thus the saw 60 are rotatable relative to the mounting block 70 in a second vertical plane perpendicular to the first vertical plane. The mounting block 70 is fixed to the tubes 64, 66, which are slidably attached to the table portion 14 below the work support plane 30.

Figure 3:
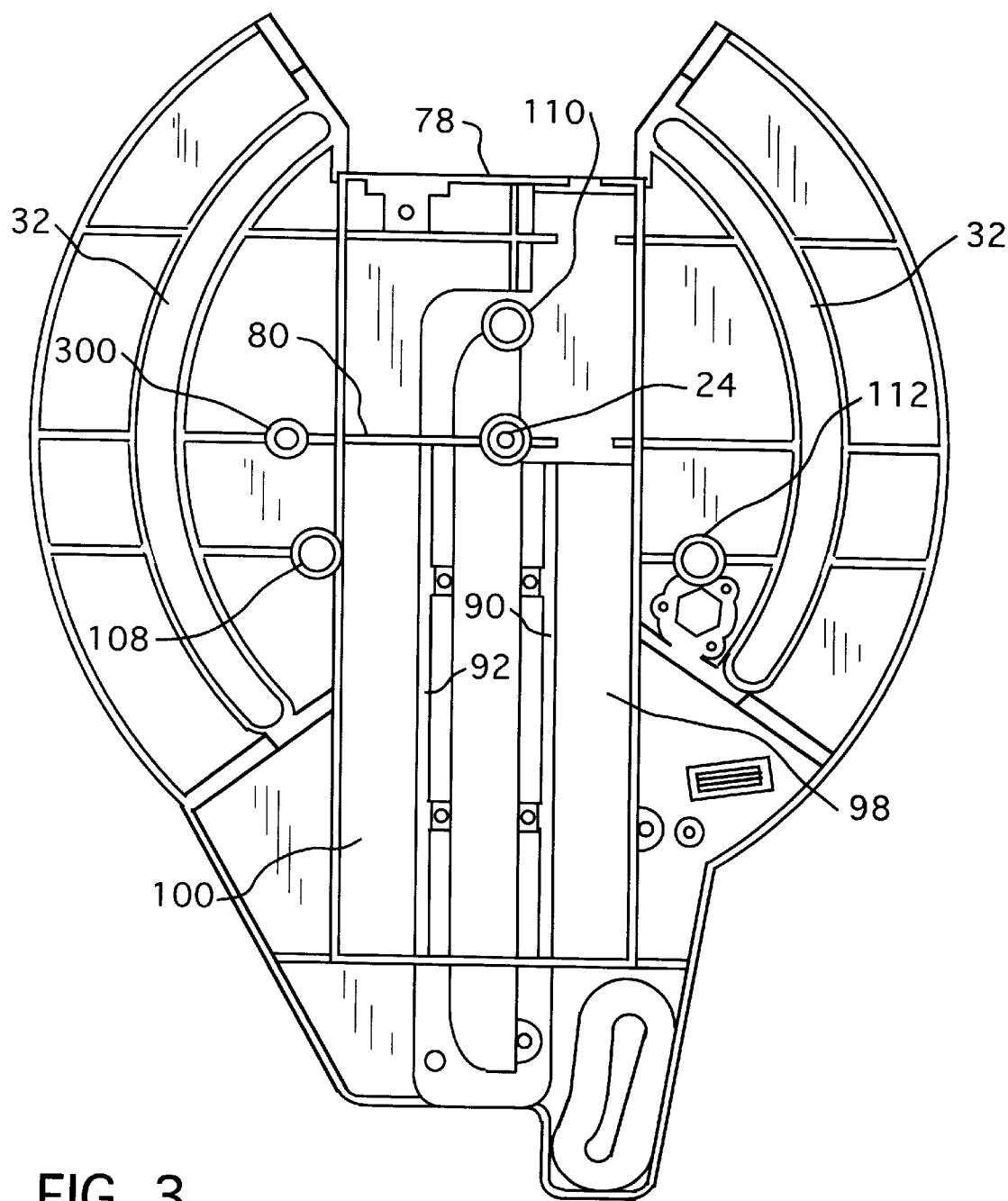
FIG. 3 is a bottom view of a table portion of FIG. 1.
Figure 4:
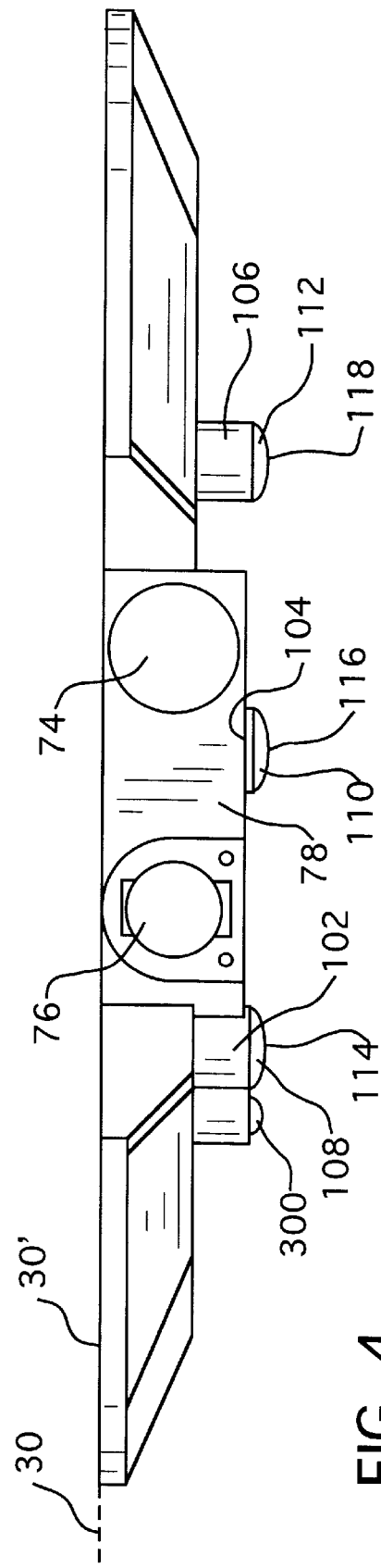
FIG. 4 is a rear end view of the table portion of FIG. 3.

As is shown in FIGS. 2–4, the tubes 64, 66 extend through passages 74, 76 in an end wall 78 of the table portion's underframe, and tube 66 additionally extends through a hole (not shown) in a connecting wall 80. The ends 82, 84 of the tubes 64, 66, respectively, furthest from the mounting block 70 are threaded into a double end cap 86, which is shown in FIG. 2. The double end cap 86 has a recess 88 therein such that it fits snugly around a pair of walls 90, 92 of the table portion underframe when assembled, such that one cap 94 of the double end cap 86 slides within a passage 98 in the table portion underframe, and the other cap 96 slides within a passage 100.

As is also shown in FIGS. 2–4, the table portion 14 includes three right circular cylindrical extensions 102, 104, 106 into which are mounted three circular wear pads 108, 110, 112. The wear pads 108, 110, 112 are preferably made of nylon, but many relatively rigid, wear resistant plastics are acceptable. The table portion 14 further has mounted thereto a restraining mechanism 200 and a spring-biased ball detent 300 which are the subject of a United States patent application filed on Jun. 6, 1994 entitled "Restraining Mechanism", which application is incorporated herein by reference. Alternatively, any known table locking mechanism may be employed. The three wear pads 108, 110, 112 each include a contact point 114, 116, 118 thereon, respectively, which together define a plane generally parallel to the work support plane 30.

Figure 5:
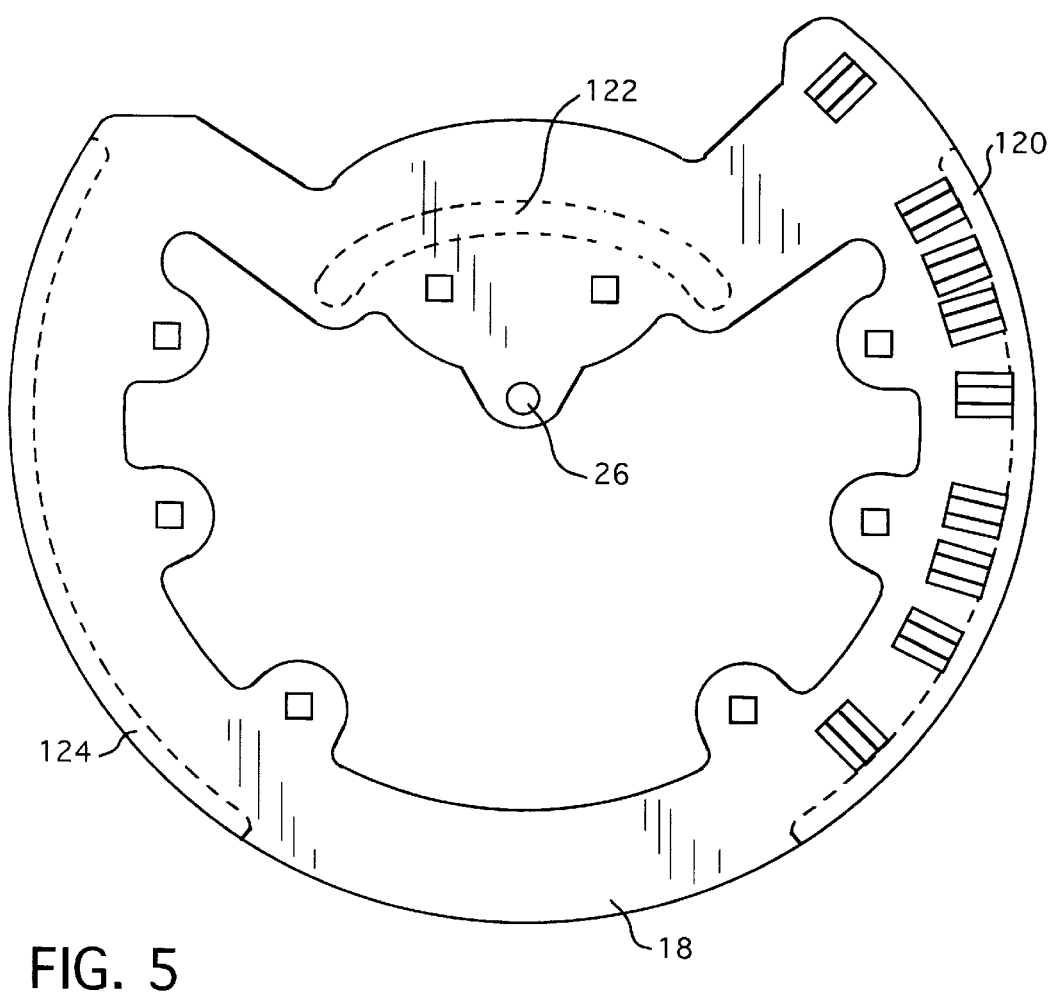
FIG. 5 is a top view of a wear ring of FIG. 1.

As is shown in FIG. 5, the wear ring 18 includes three arcuate wear zones 120, 122, 124 (shown generally by dotted lines) on an upper surface thereof. Each of the wear zones 120, 122, 124 extends over about 102 degrees of arc. The wear pads 108, 110, 112 contact the wear zones 120, 122, 124, respectively, at the contact points 114, 116, 118 to locate the work support plane 30 in a position generally parallel to the wear ring 18. Because the workpiece guide surface 44 of the fence 34 is generally perpendicular to the wear ring 18, the contact also locates the work support plane 30 in a position generally perpendicular to the workpiece guide surface 44.

With reference to FIGS. 1–5, the structure and operation of the sliding compound miter saw 10 will now be explained. The subframe 12 will normally be mounted to a stand or bench such that it is held in a stationary position. The restraining mechanism 200 is normally in a restraining position such that the table portion 14 is held stationary relative to the subframe 12. The saw 60 is normally spring biased upwardly away from the table portion 14 such that it is out of the way.

To cut a workpiece using the sliding compound miter saw 10, an operator will usually first set the miter and bevel 10 angles he or she desires. The bevel angle is set by rotating the mounting bracket 62 relative to the mounting block 70. A latch (not shown) is included to hold the mounting bracket 62 and the mounting block 70 in a desired orientation relative to each other. The miter angle is set by moving the restraining mechanism 200 to a released position such that the table portion 14 may be rotated relative to the subframe 12, rotating the table portion 14 until the plane in which a blade of the saw 60 moves is at a desired angular orientation relative to the workpiece guide surface 44, and then allowing the restraining mechanism 200 to move back to a restraining position wherein the table portion 14 is held stationary relative to the subframe 12. The angular orientation between the blade plane and the workpiece guide surface 44 is indicated by the scales 48, which are mounted to the table portion 14 and which thus rotate with the table portion 14 underneath the ends of the fence 34, as seen in FIG. 1. The table portion 14 can rotate over about 102 degrees of arc, because the posts 36 limit any further rotation through contact with the ends of the slots 32. During rotation of the table portion 14, the contact points 114, 116, 118 move across the wear ring 18 within the wear zones 120, 122, 124, and thus maintain the work support plane 30 in a position generally perpendicular to the workpiece guide surface 44.

Once the miter and bevel angles are set, the operator normally places a workpiece, such as a piece of lumber, on the upper surface 30' corresponding to the work support plane 30 of the table portion 14 firmly against the workpiece guide surface 44. In this way, the operator is assured that the blade of the saw 60 will cut the workpiece at the desired miter and bevel angles. The operator then slides the saw 60 as far forward as possible, to the position shown in FIG. 1, pivots the saw 60 relative to the mounting bracket 62 such that it moves downwardly relative to the table portion 14, and then pushes the saw 60 back through the workpiece to make the desired cut in the workpiece. As the saw 60 is pushed back, the tubes 64, 66 slide out from under the table portion 14. The operator is prevented from pushing the tubes 64, 66 completely out from under the table portion 14 by the double end cap 86, which contacts the pin 16 to limit further sliding of the saw 60. Once the cut is made, the operator allows the saw 60 to pivot upwardly relative to the mounting bracket 62 and out of the way, and removes the cut workpiece from the table portion 14.

After the sliding compound miter saw 10 is used many times, the wear pads 108, 110, 112 will eventually wear down such that they need to be replaced. To accomplish replacement, an operator can simply remove the fence 34 from the posts 36, unscrew the nut 17 holding the pin 16 to the subframe 12, and remove the table portion 14 from the subframe 12. The operator can then remove the wear pads 108, 110, 112 and replace them with new wear pads, and reassemble the table portion 14 and the fence 34 to the subframe 12. Because the wear pads 108, 110, 112 provide the contact points 114, 116, 118 which form a plane generally parallel to the work support plane 30, the wear pads 108, 110, 112 help to quickly realign the table portion 14. The wear pads 108, 110, 112 thus obviate precise measuring and calibration of the table portion location, angle, etc.

For the same reason, the wear pads 108, 110, 112 make the sliding compound miter saw 10 much easier and thus less costly to assemble when it is originally manufactured. Because the pin 16 radially locates the table portion 14, the wear ring 18, and the subframe 12 relative to each other, it also increases the ease of manufacture and reassembly. Another feature which increases the ease of manufacture is the wear ring 18 itself. Because the wear ring 18 is formed as a separate component from the base portion 20, the base portion 20 can be formed of a relatively soft, easily machinable material, such as a relatively soft steel, and need not conform to very tight tolerances. The wear ring 18 can be formed of a relatively hard material, such as a hard, wear resistant steel, and can be stamped in the proper shape with higher tolerances. This arrangement reduces the cost to form the subframe 12, but still provides a hard, wear resistant surface with the proper tolerances for the wear pads 108, 110, 112 to contact.

As stated above, all portions of the subframe 12 located within the workpiece guide area, which is defined as all points closer to the first side 44 of the fence 34 than the second side 46, are located below the upper surface 30' of the table portion 14 and the work support plane 30. Accordingly, the subframe 12 does not include any portions which extend upwardly along either side of the table portion 14 in the workpiece guide area to form a continuous surface with the work support plane 30. The lack of such portions obviates the need to machine such portions within tight tolerances, and the need to very carefully manufacture and assemble the table portion 14 and the subframe 12 such that such portions lie in the same plane as the work support plane 30. The arrangement also makes disassembly, the replacement of worn parts, and accurate reassembly possible for an ordinary operator. In addition, the arrangement allows the table portion 14 to be fairly large to provide better support to larger workpieces, while still maintaining a fairly compact overall size for the sliding compound miter saw. The arrangement also provides a workpiece guide surface 44 on a part, i.e., the fence 34, which is firmly fixed to a stationary part, i.e., the subframe 12, and thus provides a workpiece guide surface 44 which is relatively resistant to unintended movement by an operator.

The principles, a preferred embodiment and the mode of operation of the present invention have been described in the foregoing specification. However, the invention which is intended to be protected is not to be construed as limited to the particular embodiment disclosed. The embodiment is therefore to be regarded as illustrative rather than restrictive. Variations and changes may be made by others without departing from the spirit of the present invention. Accordingly, it is expressly intended that all such equivalents, variations and changes which fall within the spirit and scope of the present invention as defined in the claims be embraced thereby.

What is claimed is:

1. An adjustable tool station, comprising:
   a subframe;
   a table portion defining a work support plane along an upper surface thereof and being rotatable about an axis which is generally perpendicular to said work support plane, said table portion having a perimeter and being rotatably attached to said subframe and extending thereabove such that said subframe is completely received thereunder wherein no part of the subframe which is located below said work support plane protrudes beyond said perimeter of said table portion;

a tool operably connected to said table portion below said work support plane; and a fence affixed to said subframe and extending above said work support plane.

2. The adjustable tool station of claim 1 wherein said fence is affixed to said subframe by at least one post extending through a corresponding slot in said table portion.

3. The adjustable tool station of claim 2 wherein said tool comprises a powered saw blade and wherein said table portion has a blade-receiving slot therein.

4. The adjustable tool station of claim 3 wherein said fence comprises:

a first fence portion extending outward from a first side of said blade-receiving slot and being affixed to said subframe by one of said posts extending through one of said corresponding slots in said table portion;

a second fence portion extending outward from a second side of said blade-receiving slot and being affixed to said subframe by another one of said posts extending through another one of said corresponding slots in said table portion; and an arcuate fence portion attaching said first fence portion to said second fence portion and extending therebetween.

5. The adjustable tool station of claim 4 further comprising a first scale attached to said table portion and corresponding to said first fence portion.

6. The adjustable tool station of claim 5 further comprising a second scale portion attached to said table portion and corresponding to said second fence portion.

7. The adjustable tool station of claim 1 wherein said tool is slidably affixed to the table portion by at least one tube.

8. The adjustable tool station of claim 7 wherein said tool is pivotally affixed to a mounting bracket such that said tool is selectively pivotable in a first vertical plane relative to said mounting bracket and wherein said mounting bracket is pivotally affixed to a mounting block affixed to each said tube such that said mounting bracket is selectively pivotable relative to said mounting block in a second plane that is substantially perpendicular to said first vertical plane.

9. A sliding compound miter saw, comprising:

a subframe comprising a base member and a wear ring removably affixed to said base member;

a table portion defining a work support plane along an upper surface thereof and being rotatable about an axis which is generally perpendicular to said work support plane, said table portion being rotatably supported on said wear ring and attached to said base member, said table portion having a perimeter that is sized such that no part of the subframe which is located below said work support plane extends beyond said perimeter of said table portion;

a powered circular saw pivotably and slidably attached to said base member; and a fence attached to said base member such that said table portion is rotatable relative to said fence.

10. The sliding compound miter saw of claim 9 wherein said fence is affixed to said base member in a spaced apart relationship by a pair of posts attached to said fence and said base member and extending through corresponding arcuate slots in said t able portion.

11. The sliding compound miter saw of claim 9 wherein said table portion has a blade receiving slot therein and wherein said fence comprises:

a first fence portion extending outward from a first side of said blade-receiving slot and being affixed to said base member by one of said posts extending through one of said corresponding slots in said table portion;

a second fence portion extending outward from a second side of said blade-receiving slot and being affixed to said base member by another one of said posts extending through another one of said corresponding slots in said table portion; and an arcuate fence portion attaching said first fence portion to said second fence portion and extending therebetween.

12. The sliding compound miter saw of claim 11 further comprising a first scale attached to said table portion and corresponding to said first fence portion.

13. The sliding compound miter saw of claim 12 further comprising a second scale portion attached to said table portion and corresponding to said second fence portion.

14. The sliding compound miter saw of claim 9 wherein said powered circular saw is pivotally affixed to a mounting bracket such that said powered circular saw is selectively pivotable in a first vertical plane relative to said mounting bracket and wherein said mounting bracket is pivotally affixed to a mounting block affixed to at least one tube slidably affixed to said table portion such that said mounting bracket is selectively pivotable relative to said mounting block in a second plane that is substantially perpendicular to said first vertical plane.

15. The sliding compound miter saw of claim 9 wherein said table has a plurality of wear pads protruding therefrom and wherein at least one of said wear pads is in engagement with said wear ring.

16. The sliding compound miter saw of claim 15 wherein said wear ring has a wear zone therein that corresponds with each said wear pad on said table portion.

\* \* \* \* \*

UNITED STATES PATENT AND TRADEMARK OFFICE
CERTIFICATE OF CORRECTION

PATENT NO. : 6,289,778 B1
DATED : September 18, 2001
INVENTOR(S) : Barry D. Wixey It is certified that error appears in the above-identified patent and that said Letters Patent is hereby corrected as shown below:

Column 8,
Line 12, delete "t able" and substitute -- table -- therefor.

Signed and Sealed this

Twenty-second Day of March, 2005

JON W. DUDAS
*Director of the United States Patent and Trademark Office*